(12) United States Patent
Chu et al.

(10) Patent No.: US 10,887,221 B2
(45) Date of Patent: Jan. 5, 2021

(54) METHODS OF SYNCHRONIZATION MODE OF FLOW TABLE AND APPARATUS USING THE SAME

(71) Applicant: MediaTek Inc., Hsinchu (TW)

(72) Inventors: Chun-Yuan Chu, Taipei (TW);
Kuo-Cheng Lu, Hsinchu (TW);
Hong-Ching Chen, Kaohsiung (TW)

(73) Assignee: MediaTek Inc.

( * ) Notice: Subject to any disclaimer, the term of this patent is extended or adjusted under 35 U.S.C. 154(b) by 199 days.

(21) Appl. No.: 16/115,356

(22) Filed: Aug. 28, 2018

(65) Prior Publication Data

US 2020/0076728 A1    Mar. 5, 2020

(51) Int. Cl.
*H04L 12/721* (2013.01)

(52) U.S. Cl.
CPC .................. *H04L 45/38* (2013.01)

(58) Field of Classification Search
None
See application file for complete search history.

(56) References Cited

U.S. PATENT DOCUMENTS

| | | | |
|---|---|---|---|
| 9,419,895 B2* | 8/2016 | Liu | H04L 45/745 |
| 9,794,238 B2 | 10/2017 | Wood et al. | |
| 9,800,637 B2 | 10/2017 | Mosko et al. | |
| 10,476,747 B1* | 11/2019 | Tonsing | H04L 45/08 |
| 2011/0271007 A1 | 11/2011 | Wang et al. | |
| 2016/0315866 A1* | 10/2016 | Thapar | H04L 45/38 |
| 2019/0124184 A1* | 4/2019 | Wang | H04L 47/2483 |
| 2020/0136998 A1* | 4/2020 | Lu | H04L 45/38 |

FOREIGN PATENT DOCUMENTS

CN    101411134 B    8/2013

OTHER PUBLICATIONS

Taiwan Intellectual Property Office, Office Action for Taiwan Patent Application No. 107139293, dated Jul. 30, 2019.

* cited by examiner

*Primary Examiner* — Saba Tsegaye
(74) *Attorney, Agent, or Firm* — Han IP PLLC; Andy M. Han

(57) ABSTRACT

Examples of methods of synchronized mode of flow table and apparatus using the same are described. A method may involve receiving a first key associated with a first flow engine through a first port and a second key associated with a second flow engine through a second port. The method may also involve utilizing a match key in one or more flow entries in a flow table to obtain a first instruction for the first flow engine and a second instruction for the second flow engine.

24 Claims, 7 Drawing Sheets

METHODS OF SYNCHRONIZATION MODE OF FLOW TABLE AND APPARATUS USING THE SAME

TECHNICAL FIELD

The present disclosure is generally related to computer networking and, more particularly, to synchronized mode of flow table.

BACKGROUND

Unless otherwise indicated herein, approaches described in this section are not prior art to the claims listed below and are not admitted as prior art by inclusion in this section.

Software-defined networking (SDN) is an approach in computer networking that provides network administrators with flexibility and scalability in network management through abstraction of higher-level functionalities. In a network managed under the SDN approach, typically the control plane where the decision about where to send traffic is made is decoupled from the underlying data plane, or forwarding plane, that forwards the traffic to the decided destination. Various protocols and mechanisms may exist for facilitating communications between the control plane and the data plane. For instance, flow tables may be utilized to record and promulgate packet matching rules and actions. OpenFlow, for example, is a communications protocol that utilizes flow tables and provides access to a forwarding plane of a network node (e.g., switch or router) over the network. However, as details in actual implementations of flow tables are not specified in the protocol, there is a need to improve the efficiency in memory usage under current implementations of flow tables.

SUMMARY

The following summary is illustrative only and is not intended to be limiting in any way. That is, the following summary is provided to introduce concepts, highlights, benefits and advantages of the novel and non-obvious techniques described herein. Select, not all, implementations are further described below in the detailed description. Thus, the following summary is not intended to identify essential features of the claimed subject matter, nor is it intended for use in determining the scope of the claimed subject matter.

Implementations in accordance with the present disclosure provide an efficient and flexible way of memory usage in storing a flow table. Flow entries in a flow table may be created and stored either in a separated-entry mode as separated-entry mode flow entries or in a synchronized-entry mode as synchronized-entry mode flow entries. Advantageously, each synchronized-entry mode flow entries may contain information on pointers for instructions for two different flow engines (e.g., one for source and the other for destination for a given traffic of data packets). Moreover, bits of pointers in flow entries may be flexibly manipulated and read from the flow table.

In one example implementation, a method may involve receiving a first key associated with a first flow engine through a first port and a second key associated with a second flow engine through a second port. The method may also involve utilizing a match key in one or more flow entries in a flow table to obtain a first instruction for the first flow engine and a second instruction for the second flow engine.

In another example implementation, an apparatus may include a memory and a processor. The memory may be configured to store a flow table therein. The processor may be operably coupled to the memory to access the flow table. The processor may be configured to receive a first key associated with a first flow engine through a first port and a second key associated with a second flow engine through a second port. The processor may be configured to also utilize a match key in one or more flow entries in the flow table to obtain a first instruction for the first flow engine and a second instruction for the second flow engine.

BRIEF DESCRIPTION OF THE DRAWINGS

The accompanying drawings are included to provide a further understanding of the disclosure, and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation in order to clearly illustrate the concept of the present disclosure.

DETAILED DESCRIPTION OF PREFERRED EMBODIMENTS

Overview

Figure 1:
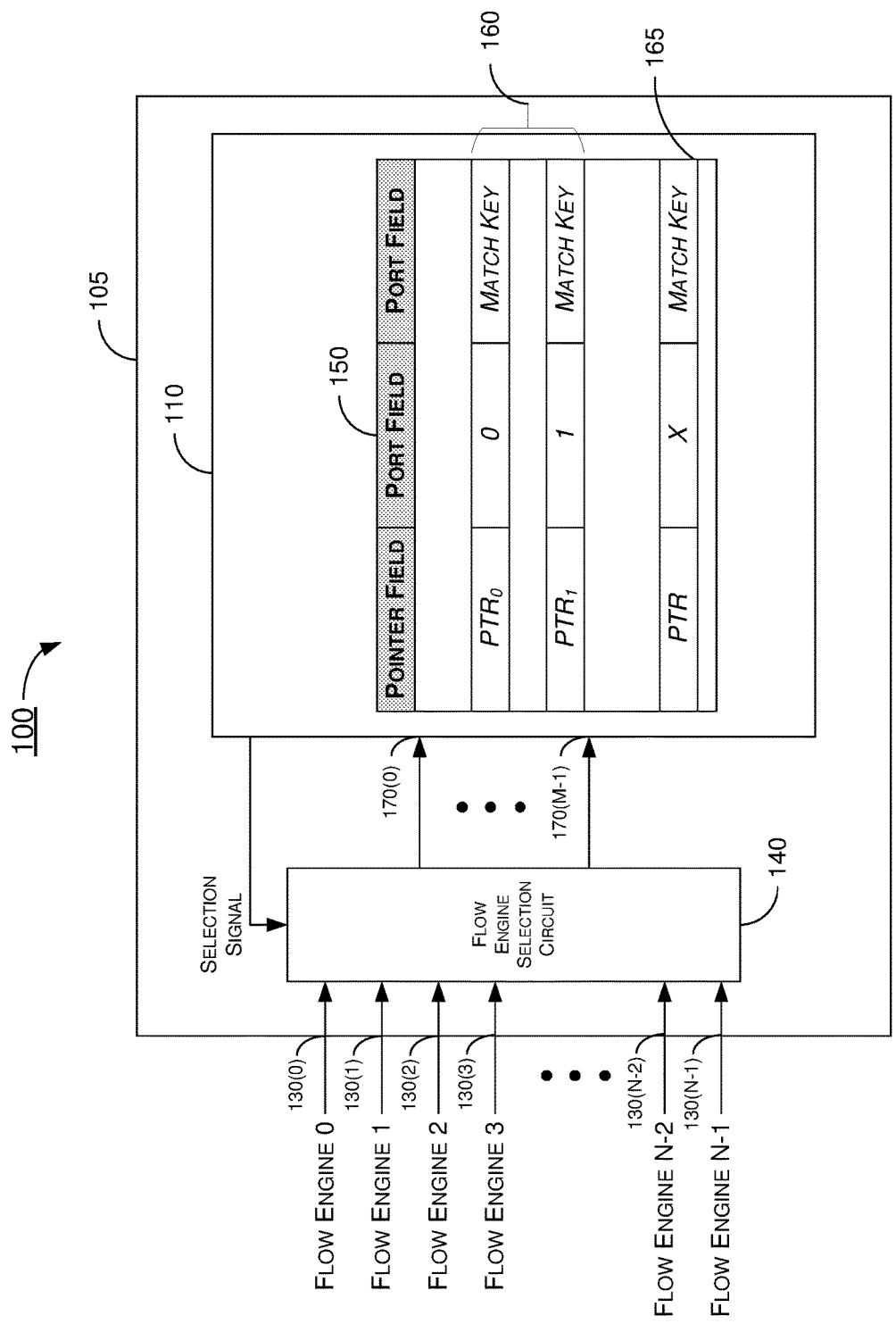
FIG. 1 is a diagram of an example architecture in which various scenarios in accordance with the present disclosure may be implemented.

FIG. 1 illustrates an example architecture 100 in which various scenarios in accordance with the present disclosure may be implemented. Architecture 100 may include an apparatus 105 which may be a part of an SDN-based network. For instance, apparatus 105 may be a part of a control plane of the SDN-based network. Apparatus 105 may include a device 110 in which various techniques, schemes, processes and methods in accordance with the present disclosure may be implemented. Apparatus 105 may also include a flow engine selection circuit 140 coupled between device 110 and a number of ports 130(0)-130(N−1), where N is a positive integer greater than 1. Each port of ports 130(0)-130(N−1) may be associated with a respective flow engine of N flow engines (shown as flow engine 0-flow engine N−1 in FIG. 1), each of which may be a network node such as, for example, a switch or a router in the SDN-based network.

Device 110 may include multiple search ports 170(0)-170(M−1), where M is a positive integer equal to or less than N. For simplicity of explanation, ease of appreciation and not to obscure the drawings, the number of search ports 170(0)-

170(M−1) in example implementations described herein is 2 although a different number (e.g., greater than 2) may be utilized in other implementations.

Device 110 may maintain a flow table 150 storing flow entries that indicate instructions on actions to take by flow engines with respect to data packets, depending on the source address (SA) and/or source IP (SIP) as well as destination address (DA) and/or destination IP (DIP) of the data packets. Flow table 150 may contain one or more flow entries 160 created and stored in a separated-entry mode. That is, each of the one or more flow entries 160 may be a separated-entry mode flow entry for a respective flow engine of flow engine 0-flow engine N−1. Flow table 150 may also contain one or more flow entries 165 created and stored in a synchronized-entry mode. That is, each of the one or more flow entries 165 may be a synchronized-entry mode flow entry for multiple (e.g., two or more) flow engines of flow engine 0-flow engine N−1. Each flow entry in flow table 150 may include a pointer field, a port field and a key field. The pointer field may contain a respective pointer indicating a location where a respective instruction is stored in memory. The port field may contain a port value indicating with which search port of search ports 170(0)-170(M−1) the respective flow entry may be associated. The key field may contain a respective match key.

In accordance with the present disclosure, two or more flow engines of flow engine 0-flow engine N−1 may share one or more flow separated-entry mode flow entries and/or one or more synchronized-entry mode flow entries in flow table 150 with the same match key. Moreover, although the match key may be the same for the two or more flow engines, a respective instruction pointer (and associated action) for each of the two or more flow engines sharing the same match key may be configured separately and different from each other.

In accordance with the present disclosure, for synchronized-entry mode flow entries in flow table 150, device 110 may ignore the search port through which a particular key is received by device 110. Accordingly, device 110 may store a generic or constant value (e.g., 0 or another value) in the port field for synchronized-entry mode flow entries in flow table 150. For separated-entry mode flow entries created and stored in separated-entry mode, device 110 may store in the port field a value corresponding to the search port with which a given separated-entry mode flow entry is associated. For instance, for a separated-entry mode flow entry associated with search port 0, device 110 may store "0" in the port field of that separated-entry mode flow entry, and for a separated-entry mode flow entry associated with search port 1, device 110 may store "1" in the port field of that separated-entry mode flow entry.

In accordance with the present disclosure, device 110 may determine, derive or otherwise obtain two or more instruction pointers from the content of a single pointer field. Accordingly, for each separated-entry mode flow entry, device 110 may store in the pointer field a pointer for a specific flow engine of flow engine 0-flow engine N−1. For each synchronized-entry mode flow entry, device 110 may store in the pointer field a pointer that may be utilized to obtain two (or more) pointers for two (or more) flow engines of flow engine 0-flow engine N−1.

Moreover, given that there are multiple bits in the pointer field, there may be multiple instructions (and hence actions) associated with each pointer in a pointer field. For instance, given a 4-bit pointer, there may be a total of 16 instructions (and hence 16 actions) associated with the pointer. Accordingly, device 110 may assign instructions (and actions) to flow engines in an asymmetric fashion or a symmetric fashion.

When assigning actions in an asymmetric fashion, device 110 may utilize unequal numbers of bits of the pointer in determining, deriving or otherwise obtaining the instructions (and hence actions) for the two (or more) flow engines. When assigning actions in a symmetric fashion, device 110 may utilize equal numbers of bits of the pointer in determining, deriving or otherwise obtaining the instructions (and hence actions) for the two (or more) flow engines. Two pointer transformations on the pointer may be performed by device 110, including a first transformation and a second transformation, to obtain a first pointer for a first flow engine (due to the first transformation) and to obtain a second pointer for a second flow engine (due to the second transformation). For illustrative purpose without limiting the scope of the present disclosure, a number of examples of pointer transformation are described herein. Those skilled in the art would appreciate that, although specific numbers and/or values are utilized in the following examples, various numbers and/or quantities may be utilized in actual implementations in accordance with the present disclosure.

In a first example of pointer transformation, for two flow engines (e.g., flow engine 0 and flow engine 1), device 110 may utilize an entire portion (i.e., full range) of the pointer (denoted as PTR) to obtain a first pointer (denoted as $T\_PTR_0$) for one of the two flow engines (e.g., flow engine 0) while utilizing a constant value to obtain a second pointer (denoted as $T\_PTR_1$) for the other of the two flow engines (e.g., flow engine 1). Mathematically, this may be expressed as $T\_PTR_0$=PTR and $T\_PTR_1$=constant value.

In a second example of pointer transformation, for two flow engines (e.g., flow engine 0 and flow engine 1), device 110 may set the pointer PTR to be the first pointer $T\_PTR_0$ for one of the two flow engines (e.g., flow engine 0). Additionally, device 110 may transforming the pointer PTR to obtain a transformed pointer (denoted as PTR^16'd1) and set the transformed pointer to be the second pointer $T\_PTR_1$ for the other of the two flow engines (e.g., flow engine 1). Mathematically, this may be expressed as $T\_PTR_0$=PTR and $T\_PTR_1$=PTR^16'd1. In this example, it is assumed that there are 16 bits in each pointer and that the transformation of the original pointer PTR is by performing an exclusive OR (XOR) operation between PTR and a decimal value of 1 (or, "0000000000000001" in binary form and "0001" in hexadecimal form).

In a third example of pointer transformation, for two flow engines (e.g., flow engine 0 and flow engine 1), device 110 may utilize a respective sub-range or portion of the pointer PTR to obtain a respective pointer for each of the two flow engines. For instance, assuming there are 16 bits in PTR, device 110 may utilize the least significant X+1 bits of PTR, or bits PTR[X:0], to obtain the first pointer $T\_PTR_0$ for one of the two flow engines (e.g., flow engine 0). Correspondingly, device 110 may utilize the most significant 16−(X+1) bits of PTR, or bits PTR[15:X+1], to obtain the second pointer $T\_PTR_1$ for one of the two flow engines (e.g., flow engine 0). Mathematically, this may be expressed as $T\_PTR_0$=PTR[X:0] and $T\_PTR_1$=PTR[15:X+1]. The transformation to obtain the second pointer $T\_PTR_1$ may be performed by, for example and not limited to, a barrel shifter included in device 110.

In a fourth example of pointer transformation, for two flow engines (e.g., flow engine 0 and flow engine 1), device 110 may utilize a respective sub-range or portion of the pointer PTR to obtain a respective pointer for each of the two flow engines with reverse concatenation. For instance, assuming there are 16 bits in PTR, device 110 may utilize the least significant X+1 bits of PTR, or bits PTR[X:0], to obtain the first pointer $T\_PTR_0$ for one of the two flow engines (e.g., flow engine 0). Correspondingly, device 110 may reverse the order of the most significant 16−(X+1) bits of PTR, or bits PTR[15:X], to obtain the second pointer $T\_PTR_1$ for one of the two flow engines (e.g., flow engine 0). Mathematically, this may be expressed as $T\_PTR_0$=PTR [X:0] and $T\_PTR_1$=PTR[X+1:15]. The transformation to obtain the second pointer $T\_PTR_1$ (e.g., reversal of the order of bits) may be performed by, for example and not limited to, software executed by device 110 or another hardware (e.g., a processor or a central processing unit).

Figure 2:
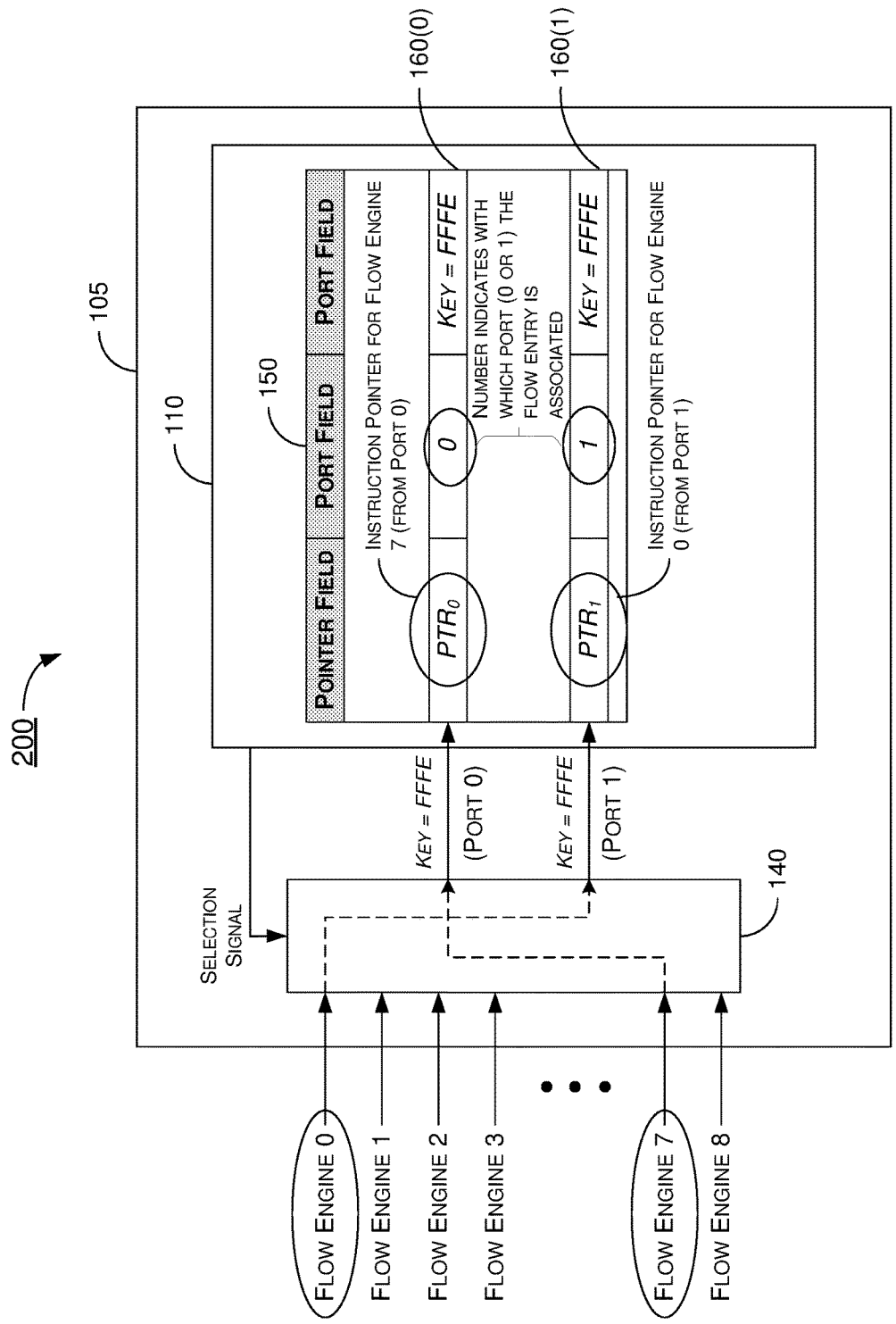
FIG. 2 is a diagram of an example scenario in accordance with an implementation of the present disclosure.

FIG. 2 illustrates an example scenario 200 with respect to architecture 100 in accordance with an implementation of the present disclosure. In scenario 200, flow engine selection circuit 140 may receive a selection signal from device 110 to select M of the N number of flow engines 130(0)-130 (N−1) for matching, and flow table 150 may include a separated-entry mode flow entry 160(0) and another separated-entry mode flow entry 160(1). Accordingly, a respective key associated with each selected flow engine may be provided to or otherwise received by device 110 through a respective one of the search ports 170(0)-170(M−1).

In the example shown in FIG. 2, there are two search ports (i.e., M=2), and flow engine 0 and flow engine 7 are selected, with the key associated with flow engine 7 received by device 110 through search port 0 and the key associated with flow engine 0 received by device 110 through search port 1. In the example shown in FIG. 2, there is a match between the key associated with flow engine 7, the key associated with flow engine 0, and the match key in the key field of each of flow entries 160(0) and 160(1), having the hexadecimal value of "FFFE". Additionally, the port field of flow entry 160(0) has a value of "0" which indicates flow entry 160(0) is associated with search port 0, and the port field of flow entry 160(1) has a value of "1" which indicates flow entry 160(1) is associated with search port 1. Accordingly, the pointer $PTR_0$ contained in the pointer field of flow entry 160(0) indicates a memory location in which an instruction for flow engine 7 is stored. Likewise, the pointer $PTR_1$ contained in the pointer field of flow entry 160(1) indicates a memory location in which an instruction for flow engine 0 is stored.

Example Implementations

Figure 3:
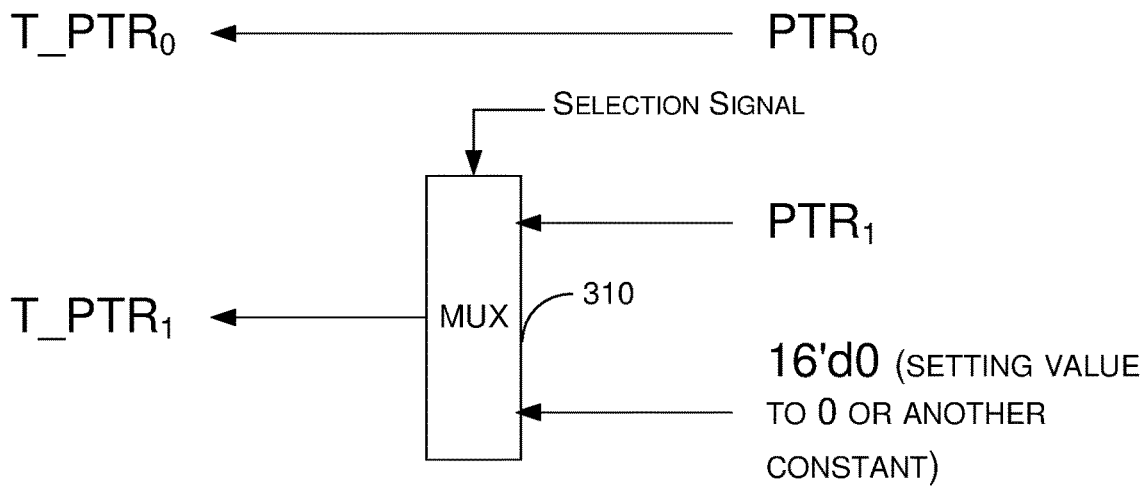
FIG. 3 is a diagram of an example implementation in accordance with the present disclosure.

FIG. 3 illustrates an example implementation 300 in accordance with the present disclosure. As shown in FIG. 3, implementation 300 may include hardware component(s) and/or architecture for rendering the first example of pointer transformation described above. In the example shown in FIG. 3, a first pointer (e.g., $PTR_0$) for a first flow engine is set to a value (e.g., $PTR_0$) contained in the pointer field of a first flow entry (e.g., flow entry 160(0) in scenario 200), and a second pointer (e.g., $PTR_1$) for a second flow engine is set to either a value (e.g., $PTR_1$) contained in the pointer field of a second flow entry (e.g., flow entry 160(1) in scenario 200) or a constant value (e.g., 0 or another value) through a multiplexer 310. In some cases, implementation 300 may be achieved by software instead of hardware and, for illustrative purpose without limiting the scope of the present disclosure, the following code is an example.

```
// First example of pointer transformation
T_PTR0 = PTR0;
T_PTR1 = 0; // or another constant value
```

The assignment of actions in implementation 300 is asymmetric. This is because, in the example described above, the first flow engine is assigned multiple actions (with $T\_PTR_0$=$PTR_0$) while the second flow engine is assigned one action (with $T\_PTR_1$=0 or another constant value).

Figure 4:
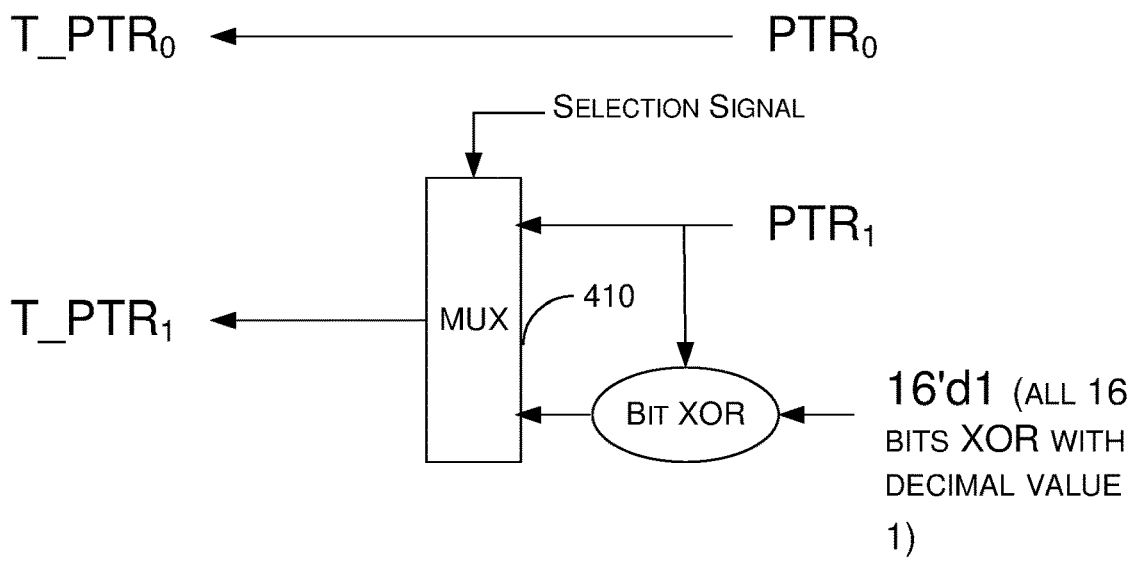
FIG. 4 is a diagram of an example implementation in accordance with the present disclosure.

FIG. 4 illustrates an example implementation 400 in accordance with the present disclosure. As shown in FIG. 4, implementation 400 may include hardware component(s) and/or architecture for rendering the second example of pointer transformation described above. In the example shown in FIG. 4, a first pointer (e.g., $PTR_0$) for a first flow engine is set to a value (e.g., $PTR_0$) contained in the pointer field of a first flow entry (e.g., flow entry 160(0) in scenario 200), and a second pointer (e.g., $PTR_1$) for a second flow engine is set to either a value (e.g., $PTR_1$) contained in the pointer field of a second flow entry (e.g., flow entry 160(1) in scenario 200) or a transformed version of $PTR_1$ (e.g., PTR^16'd1) through a multiplexer 410. In some cases, implementation 400 may be achieved by software instead of hardware and, for illustrative purpose without limiting the scope of the present disclosure, the following code is an example.

```
// Second example of pointer transformation
T_PTR0 = PTR0;
T_PTR1 = PTR1 ^ 16'd1;
```

The assignment of actions in implementation 400 is symmetric. This is because, in the example described above, the first flow engine is assigned multiple actions (with $T\_PTR_0$=$PTR_0$) while the second flow engine is assigned equal number of multiple actions (with $T\_PTR_1$=$PTR_1$^16'd1).

Figure 5:
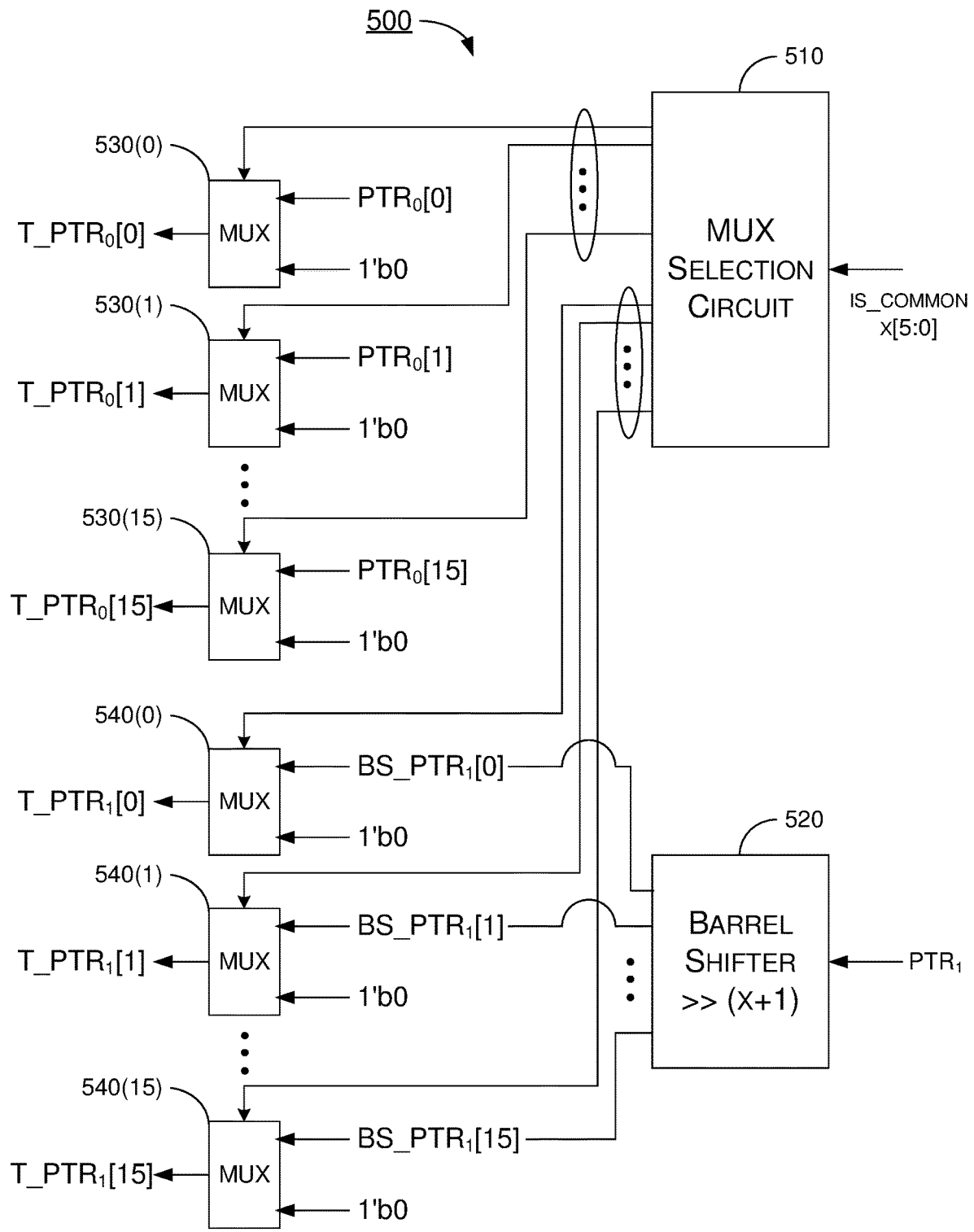
FIG. 5 is a diagram of an example implementation in accordance with the present disclosure.

FIG. 5 illustrates an example implementation 500 in accordance with the present disclosure. As shown in FIG. 5, implementation 500 may include hardware component(s) and/or architecture for rendering the second example of pointer transformation described above. The hardware components may include, for example, a multiplexer selection circuit 510, a barrel shifter 520, multiple first multiplexers 530(0)-530(X−1) and multiple second multiplexers 540(0)-540(X−1). In the example show in FIG. 5, there are 16 bits in the pointer field and thus X is equal to 16. In the example shown in FIG. 5, assuming there are 16 bits in the pointer field, each of the bits of a first pointer (e.g., $T\_PTR_0$) for a first flow engine is set to either a respective bit of a value (e.g., $PTR_0$) contained in the pointer field of a first flow entry (e.g., flow entry 160(0) in scenario 200) or a constant value (e.g., 0) through a respective multiplexer of multiplexers 530(0)-530(15). Each of the bits of a second pointer (e.g., $T\_PTR_1$) for a second flow engine is set to either a barrel-shifted bit of a value (e.g., $PTR_1$) contained in the pointer field of a second flow entry (e.g., flow entry 160(1) in scenario 200) or a constant value (e.g., 0) through a respective multiplexer of multiplexers 540(0)-540(15). In implementation 500, the least significant X+1 bits of $PTR_0$, or bits $PTR_0$[X:0], may be utilized to obtain the first pointer $T\_PTR_0$ for the first flow engine, and the most significant 16−(X+1) bits of $PTR_1$, or bits $PTR_1[15:X+1]$, may be utilized to obtain the second pointer $T\_PTR_1$ for the second flow engine.

In some cases, implementation 500 may be achieved by software instead of hardware and, for illustrative purpose without limiting the scope of the present disclosure, the following code is an example.

```
// Third example of pointer transformation
if (is_common) {
    if (X < 16) {
        PTR0 = PTR0[X:0];
        PTR1 = PTR1[15:X+1];
    }
    else if (x ==16) {
        PTR0 = 0;
        PTR1 = PTR1;
    }
    else {
        PTR0 = PTR0;
        PTR1 = PTR1;
    }
}
```

The assignment of actions in implementation 500 may be symmetric or asymmetric. This is because, in the example described above, the number of bits (X+1) for assigning actions to the first flow engine may or may not be equal to the number of bits (15−X) for assigning actions to the second flow engine.

Figure 6:
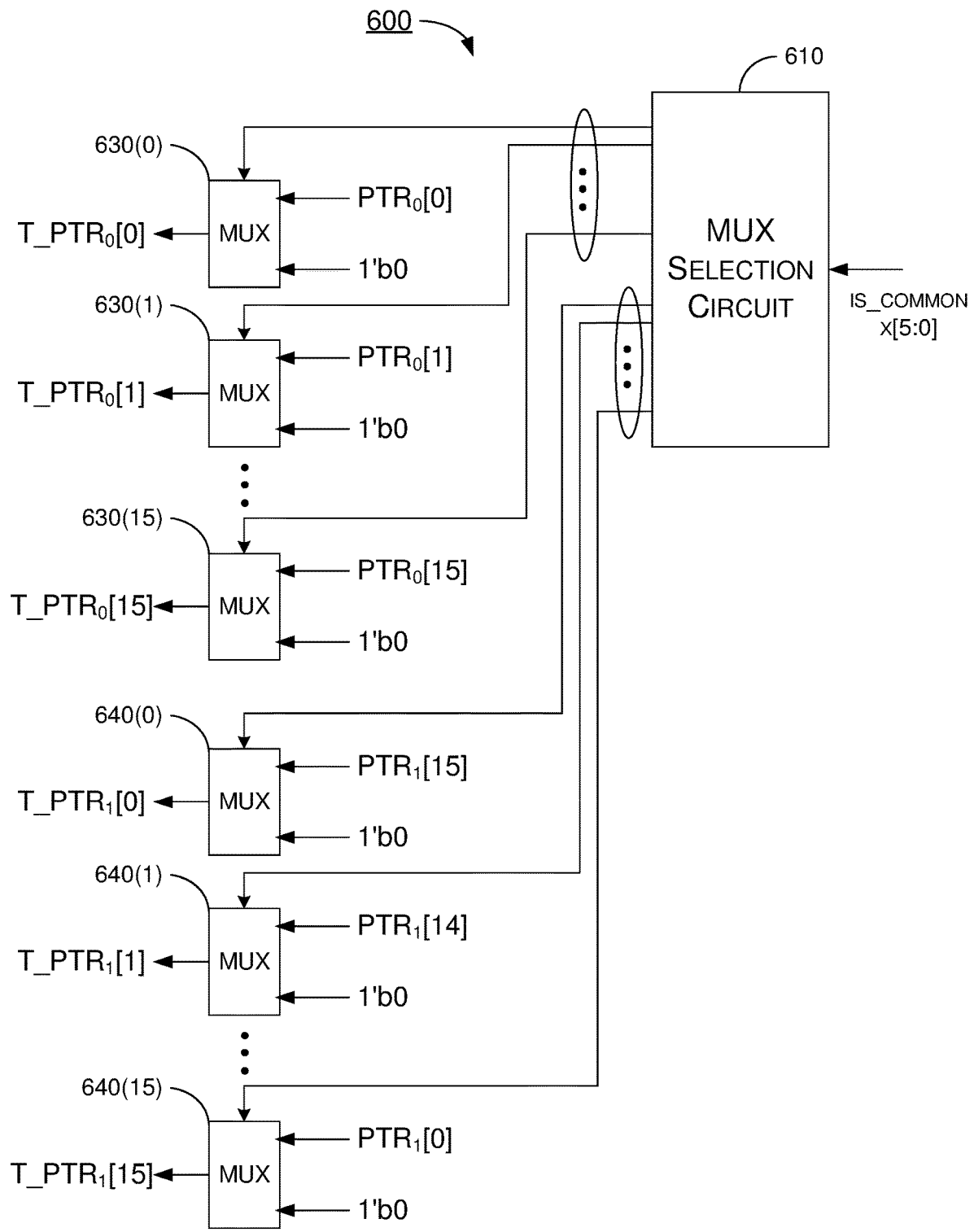
FIG. 6 is a diagram of an example implementation in accordance with the present disclosure.

FIG. 6 illustrates an example implementation 600 in accordance with the present disclosure. As shown in FIG. 6, implementation 600 may include hardware component(s) and/or architecture for rendering the second example of pointer transformation described above. The hardware components may include, for example, a multiplexer selection circuit 610, multiple first multiplexers 630(0)-630(X−1) and multiple second multiplexers 640(0)-640(X−1). In the example show in FIG. 6, there are 16 bits in the pointer field and thus X is equal to 16. In the example shown in FIG. 6, assuming there are 16 bits in the pointer field, each of the bits of a first pointer (e.g., $T\_PTR_0$) for a first flow engine is set to either a respective bit of a value (e.g., $PTR_0$) contained in the pointer field of a first flow entry (e.g., flow entry 160(0) in scenario 200) or a constant value (e.g., 0) through a respective multiplexer of multiplexers 630(0)-630 (15). The bits of a second pointer (e.g., $T\_PTR_1$) for a second flow engine are set to either reverse-ordered bits of a value (e.g., $PTR_1$) contained in the pointer field of a second flow entry (e.g., flow entry 160(1) in scenario 200) or a constant value (e.g., 0). In implementation 600, the least significant X+1 bits of $PTR_0$, or bits $PTR_0[X:0]$, may be utilized to obtain the first pointer $T\_PTR_0$ for the first flow engine, and the most significant 16−(X+1) bits of $PTR_1$, or bits $PTR_1[15:X+1]$, may be utilized and reverse-ordered to obtain the second pointer $T\_PTR_1$ for the second flow engine. The reversal of the order of bits may be performed by software.

In some cases, implementation 600 may be achieved by software instead of hardware and, for illustrative purpose without limiting the scope of the present disclosure, the following code is an example.

```
// Fourth example of pointer transformation
if (is_common) {
    if (X < 16) {
        PTR0 = PTR0[X:0];
        PTR1 = PTR1[X+1:15];
    }
    else if (x ==16) {
        PTR0 = 0;
        PTR1 = PTR1;
    }
    else {
        PTR0 = PTR0;
        PTR1 = 0;
    }
}
else {
    PTR0 = PTR0;
    PTR1 = PTR1;
}
```

The assignment of actions in implementation 600 may be symmetric or asymmetric. This is because, in the example described above, the number of bits (X+1) for assigning actions to the first flow engine may or may not be equal to the number of bits (15−X) for assigning actions to the second flow engine.

Example Apparatus

Figure 7:
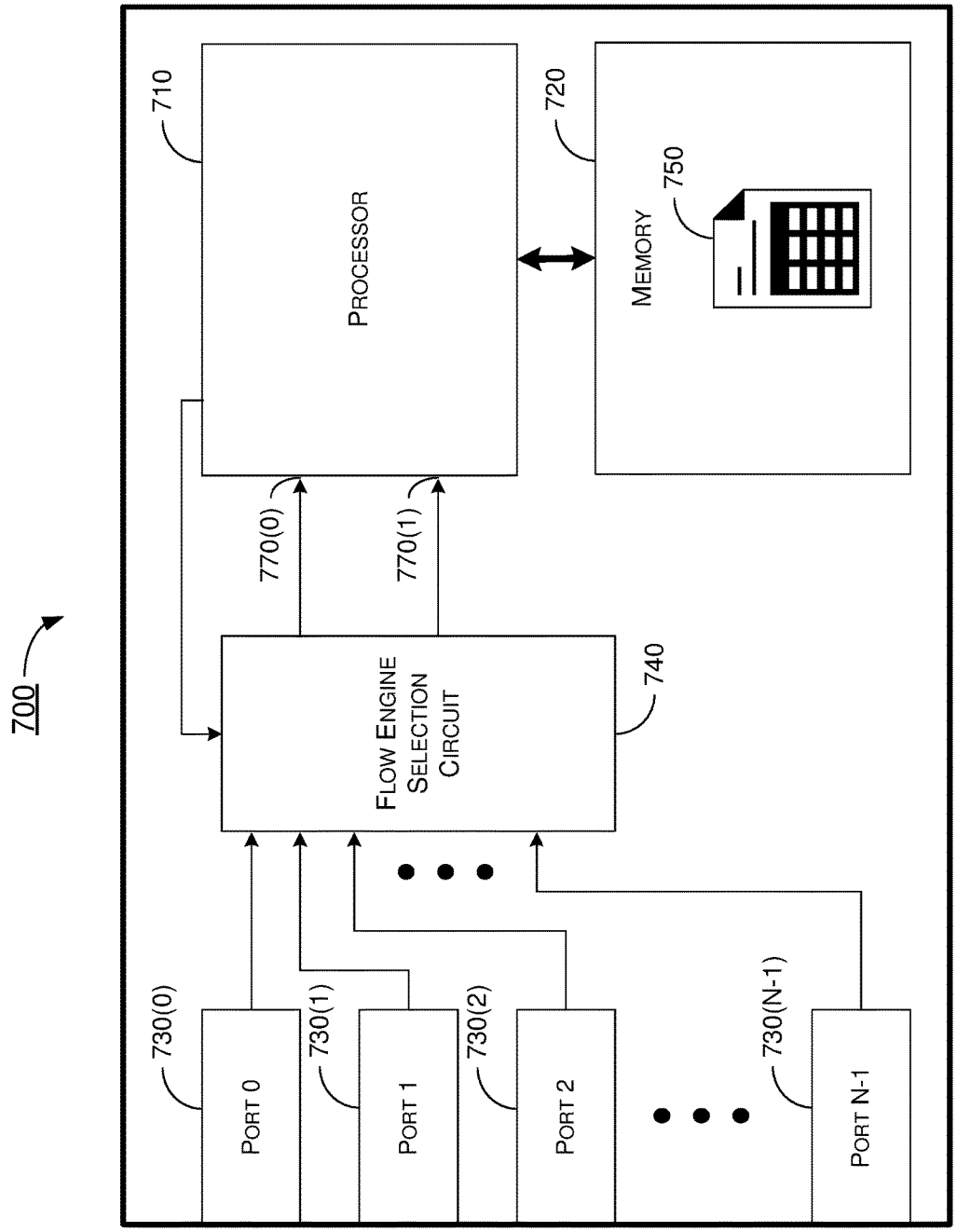
FIG. 7 is a diagram of an example apparatus in accordance with implementations of the present disclosure.

FIG. 7 illustrates an example apparatus 700 in accordance with implementations of the present disclosure. Apparatus 700 may be configured to implement architecture 100, scenario 200 and implementations 300-600 described above as well as process 800 described below. Apparatus 700 may be a network device, a computing device or otherwise an electronic device configured to implement techniques, schemes, processes and methods in accordance with the present disclosure. Apparatus 700 may include at least those components shown in FIG. 7 as well as one or more other components that are not necessarily relevant to the scope of the present disclosure. Therefore, to avoid obscuring the concept intended to be conveyed herein, these other components of apparatus 700 are not shown in FIG. 7.

Apparatus 700 may be an example implementation of apparatus 110 and, thus, features, functionalities and configurations described above with respect to apparatus 110 of its components may apply to apparatus 700 and its components. In the example shown in FIG. 7, apparatus 700 includes a processor 710, a memory 720, a plurality of flow engine ports 730(0)-730(N−1) where N is a positive integer greater than 1, and a flow engine selection circuit 740. Processor 710 may include a number of search ports, such as first search port 770(0) and second search port 770(1), through which processor 710 may receive values of keys from flow engines selected by flow engine selection circuit 740. Flow engines selected by flow engine selection circuit 740 may be, for example and not limited to, a multiplexer or a type of switch.

Memory 720 may be configured to store software, e.g., in the form of one or more processor-executable sets of instructions, for execution by processor 710. For instance, memory 720 may store the example software codes listed above for processor 710 to render implementations 300, 400, 500 and/or 600. Memory 720 may also be configured to store one or more flow tables such as a flow table 750 similar to flow table 150 described above. Memory 720 may include one or more computer-readable mediums such as a type of read-only memory (ROM) or random-access memory (RAM). For example, memory 720 may include a dynamic RAM (DRAM), static RAM (SRAM), thyristor RAM (T-RAM), zero-capacitor RAM (Z-RAM) or another type of volatile memory. As another example, memory device may include mask ROM, programmable ROM (PROM), erasable programmable ROM (EPROM), electrically-erasable programmable ROM (EEPROM), flash memory, solid-state memory or another type of non-volatile memory.

In one aspect, processor 710 may be implemented in the form of one or more single-core processors, one or more multi-core processors, or one or more complex instruction set computing (CISC) processors. That is, even though a singular term "a processor" is used herein to refer to processor 710, processor 710 may include multiple processors in some implementations and a single processor in other implementations in accordance with the present disclosure. In another aspect, processor 710 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, processor 710 is a special-purpose machine specifically designed, arranged and configured to perform specific tasks including synchronized mode of flow table in accordance with various implementations of the present disclosure.

Processor 710 may be implemented in the form of one single integrated-circuit (IC) chip, multiple IC chips or a chipset. Processor 710 may include necessary hardware and firmware to execute various implementations in accordance with the present disclosure. For instance, processor 710 may include the hardware components shown in FIG. 3, FIG. 4, FIG. 5 and/or FIG. 6 to render implementations 300, 400, 500 and/or 600. The hardware of processor 710 may include, for example and not limited to, a combination of one or more transistors, one or more diodes, one or more switches, one or more capacitors, one or more resistors and one or more inductors. Processor 710 may be operably coupled to memory 720 to access, modify, update and maintain flow table 750. Processor 710 may be configured to perform a number of operations in accordance with various implementations of the present disclosure. For instance, processor 710 may receive a first key associated with a first flow engine through first search port 770(0). Processor 710 may also receive a second key associated with a second flow engine through second port 770(1). Processor 710 may further utilize a match key in one or more flow entries in flow table 750 to obtain a first instruction for the first flow engine and a second instruction for the second flow engine. In the interest of brevity and to avoid redundancy, select features of processor 710 are described below with respect to process 800.

In some implementations, processor 710 may be capable of receiving a first key associated with a first flow engine through a first port and a second key associated with a second flow engine through a second port. Moreover, processor 710 may be capable of utilizing a match key in one or more flow entries in the flow table to obtain a first instruction for the first flow engine and a second instruction for the second flow engine.

In some implementations, in utilizing the match key in one or more flow entries in the flow table to obtain the first instruction for the first flow engine and the second instruction for the second flow engine, processor 710 may be capable of determining that the first key matches the match key and determining that the second key matches the match key.

In some implementations, each flow entry in the flow table may include a pointer field and a key field. Additionally, the pointer field may contain a respective pointer indicating a location where a respective instruction is stored. Moreover, the key field may contain a respective match key.

In some implementations, each flow entry in the flow table may further include a port field containing a port value. In such cases, in utilizing the match key in one or more flow entries in the flow table to obtain the first instruction for the first flow engine and the second instruction for the second flow engine, processor 710 may be capable of ignoring the port value in the port field of the one or more flow entries in obtaining the first instruction for the first flow engine and the second instruction for the second flow engine. Furthermore, each flow entry of the one or more flow entries may include a synchronized-entry mode flow entry.

In some implementations, in utilizing the match key in one or more flow entries in the flow table to obtain the first instruction for the first flow engine and the second instruction for the second flow engine, processor 710 may be capable of performing action assignment to the first flow engine and the second flow engine in an asymmetric fashion.

In some implementations, in performing action assignment to the first flow engine and the second flow engine in an asymmetric fashion, processor 710 may be capable of obtaining the first instruction using a pointer in the pointer field of at least one of the one or more flow entries. Additionally, processor 710 may be capable of obtaining the second instruction using a constant value.

In some implementations, in utilizing the match key in one or more flow entries in the flow table to obtain the first instruction for the first flow engine and the second instruction for the second flow engine, processor 710 may be capable of performing action assignment to the first flow engine and the second flow engine in a symmetric fashion.

In some implementations, in performing action assignment to the first flow engine and the second flow engine in a symmetric fashion, processor 710 may be capable of obtaining the first instruction using a pointer in the pointer field of at least one flow entry of the one or more flow entries. Additionally, processor 710 may be capable of transforming the pointer into a transformed pointer. Moreover, processor 710 may be capable of obtaining the second instruction using the transformed pointer.

In some implementations, in utilizing the match key in one or more flow entries in the flow table to obtain the first instruction for the first flow engine and the second instruction for the second flow engine, processor 710 may be capable of obtaining the first instruction using a first pointer based on a pointer in the pointer field of at least one flow entry of the one or more flow entries. Moreover, processor 710 may be capable of obtaining the second instruction using a second pointer based on the pointer in the pointer field of the at least one flow entry. The pointer in the pointer field of the at least one flow entry may contain a combination the first pointer and the second pointer. The first pointer and the second pointer may be directly concatenated to form the pointer such that a most significant bit (MSB) of the first pointer is concatenated to a least significant bit (LSB) of the second pointer, with an LSB of the first pointer being an LSB of the pointer and with an MSB of the second pointer being an MSB of the pointer.

Alternatively, in utilizing the match key in one or more flow entries in the flow table to obtain the first instruction for the first flow engine and the second instruction for the second flow engine, processor 710 may be capable of obtaining the first instruction using a first pointer based on a pointer in the pointer field of at least one flow entry of the one or more flow entries. Moreover, processor 710 may be capable of obtaining the second instruction using a second pointer based on the pointer in the pointer field of the at least one flow entry. The pointer in the pointer field of the at least one flow entry may contain a combination the first pointer and the second pointer. The first pointer and the second pointer may be reversely concatenated to form the pointer such that an MSB of the first pointer is concatenated to an MSB of the second pointer, with an LSB of the first pointer being an LSB of the pointer and with an LSB of the second pointer being an MSB of the pointer.

In some implementations, in utilizing the match key in one or more flow entries in the flow table to obtain the first instruction for the first flow engine and the second instruction for the second flow engine, processor 710 may be capable of maintaining a first flow entry of the one or more flow entries in a synchronized-entry mode. Additionally, processor 710 may be capable of utilizing the first flow entry to obtain the first instruction and the second instruction.

In some implementations, in utilizing the match key in one or more flow entries in the flow table to obtain the first instruction for the first flow engine and the second instruction for the second flow engine, processor 710 may be capable of maintaining a first flow entry and a second flow entry of the one or more flow entries in a separated-entry mode. Additionally, processor 710 may be capable of utilizing the first flow entry to obtain the first instruction. Moreover, processor 710 may be capable of utilizing the second flow entry to obtain the second instruction. The first flow entry may include a first pointer field containing a first pointer indicating a first location where the first instruction is stored. The first flow entry may also include a first port field containing a first port value indicating the first port. The second flow entry may include a second pointer field containing a second pointer indicating a second location where the second instruction is stored. The second flow entry may also include a second port field containing a second port value indicating the second port.

Example Process

Figure 8:
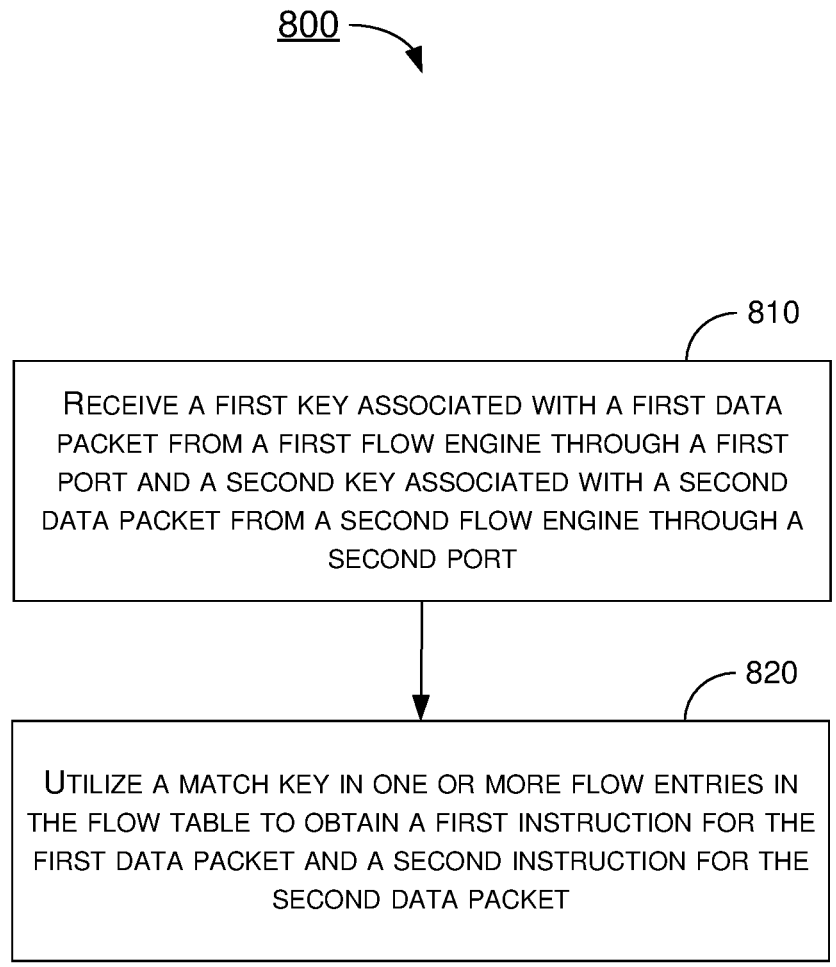
FIG. 8 is a diagram of an example process in accordance with an implementation of the present disclosure.

FIG. 8 illustrates an example process 800 in accordance with an implementation of the present disclosure. Process 800 may include one or more operations, actions, or functions as represented by one or more of blocks 810 and 820. Although illustrated as discrete blocks, various blocks of process 800 may be divided into additional blocks, combined into fewer blocks, or eliminated, depending on the desired implementation. The blocks of process 800 may be performed in the order shown in FIG. 8 or in any other order, depending on the desired implementation. Process 800 may be implemented by apparatus 105 and apparatus 700. Solely for illustrative purpose and without limiting the scope of the present disclosure, process 800 is described below in the context of process 800 being performed by apparatus 700. Process 800 may begin at 810.

At 810, process 800 may involve processor 710 of apparatus 700 receiving a first key associated with a first flow engine through a first port and a second key associated with a second flow engine through a second port. Process 800 may proceed from 810 to 820.

At 820, process 800 may involve processor 710 of apparatus 700 utilizing a match key in one or more flow entries in a flow table to obtain a first instruction for the first flow engine and a second instruction for the second flow engine.

In some implementations, in utilizing the match key in one or more flow entries in the flow table to obtain the first instruction for the first flow engine and the second instruction for the second flow engine, process 800 may involve processor 710 determine that the first key matches the match key. Process 800 may also involve processor 710 determining that the second key matches the match key.

In some implementations, each flow entry in the flow table may include a pointer field and a key field. The pointer field may contain a respective pointer indicating a location where a respective instruction is stored. The key field may contain a respective match key. In some implementations, each flow entry in the flow table may also include a port field containing a port value. In utilizing the match key in one or more flow entries in the flow table to obtain the first instruction for the first flow engine and the second instruction for the second flow engine, process 800 may involve processor 710 ignoring the port value in the port field of the one or more flow entries in obtaining the first instruction for the first flow engine and the second instruction for the second flow engine. Each flow entry of the one or more flow entries may include a synchronized-entry mode flow entry.

In some implementations, in utilizing the match key in one or more flow entries in the flow table to obtain the first instruction for the first flow engine and the second instruction for the second flow engine, process 800 may involve processor 710 performing action assignment to the first flow engine and the second flow engine in an asymmetric fashion. In some implementations, in performing action assignment to the first flow engine and the second flow engine in an asymmetric fashion, process 800 may involve processor 710 obtaining the first instruction using a pointer in the pointer field of at least one of the one or more flow entries. Process 800 may also involve processor 710 obtaining the second instruction using a constant value.

Alternatively or additionally, in utilizing the match key in one or more flow entries in the flow table to obtain the first instruction for the first flow engine and the second instruction for the second flow engine, process 800 may involve processor 710 performing action assignment to the first flow engine and the second flow engine in a symmetric fashion. In some implementations, in performing action assignment to the first flow engine and the second flow engine in a symmetric fashion, process 800 may involve processor 710 obtaining the first instruction using a pointer in the pointer field of at least one flow entry of the one or more flow entries. Process 800 may also involve processor 710 transforming the pointer into a transformed pointer. Process 800 may further involve processor 710 obtaining the second instruction using the transformed pointer.

In some implementations, in utilizing the match key in one or more flow entries in the flow table to obtain the first instruction for the first flow engine and the second instruction for the second flow engine, process 800 may involve processor 710 obtaining the first instruction using a first pointer based on a pointer in the pointer field of at least one flow entry of the one or more flow entries. Process 800 may also involve processor 710 obtaining the second instruction using a second pointer based on the pointer in the pointer field of the at least one flow entry. The pointer in the pointer field of the at least one flow entry may contain a combination the first pointer and the second pointer. The first pointer and the second pointer may be directly concatenated to form the pointer such that a most significant bit (MSB) of the first pointer is concatenated to a least significant bit (LSB) of the second pointer, with an LSB of the first pointer being an LSB of the pointer and with an MSB of the second pointer being an MSB of the pointer.

Alternatively, in utilizing the match key in one or more flow entries in the flow table to obtain the first instruction for the first flow engine and the second instruction for the second flow engine, process 800 may involve processor 710 obtaining the first instruction using a first pointer based on a pointer in the pointer field of at least one flow entry of the one or more flow entries. Process 800 may also involve processor 710 obtaining the second instruction using a second pointer based on the pointer in the pointer field of the at least one flow entry. The pointer in the pointer field of the at least one flow entry may contain a combination the first pointer and the second pointer. The first pointer and the second pointer may be reversely concatenated to form the pointer such that an MSB of the first pointer is concatenated to an MSB of the second pointer, with an LSB of the first pointer being an LSB of the pointer and with an LSB of the second pointer being an MSB of the pointer.

In some implementations, in utilizing the match key in one or more flow entries in the flow table to obtain the first instruction for the first flow engine and the second instruction for the second flow engine, process 800 may involve processor 710 maintaining a first flow entry of the one or more flow entries in a synchronized-entry mode. Process 800 may also involve processor 710 utilizing the first flow entry to obtain the first instruction and the second instruction.

In some implementations, in utilizing the match key in one or more flow entries in the flow table to obtain the first instruction for the first flow engine and the second instruction for the second flow engine, process 800 may involve processor 710 maintaining a first flow entry and a second flow entry of the one or more flow entries in a separated-entry mode. Process 800 may also involve processor 710 utilizing the first flow entry to obtain the first instruction. Process 800 may further involve processor 710 utilizing the second flow entry to obtain the second instruction. The first flow entry may include a first pointer field containing a first pointer indicating a first location where the first instruction is stored. The first flow entry may also include a first port field containing a first port value indicating the first port. The second flow entry may include a second pointer field containing a second pointer indicating a second location where the second instruction is stored. The second flow entry may also include a second port field containing a second port value indicating the second port.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
  receiving, by a processor of an apparatus, a first key associated with a first flow engine through a first port and a second key associated with a second flow engine through a second port; and
  utilizing, by the processor, a match key in one or more flow entries in a flow table to obtain a first instruction for the first flow engine and a second instruction for the second flow engine,
  wherein each flow entry in the flow table comprises a port field containing a port value, and
  wherein the utilizing of the match key in one or more flow entries in the flow table to obtain the first instruction for the first flow engine and the second instruction for the second flow engine comprises ignoring the port value in the port field of the one or more flow entries in obtaining the first instruction for the first flow engine and the second instruction for the second flow engine.

2. The method of claim 1, wherein the utilizing of the match key in one or more flow entries in the flow table to obtain the first instruction for the first flow engine and the second instruction for the second flow engine comprises:
  determining that the first key matches the match key; and
  determining that the second key matches the match key.

3. The method of claim 1, wherein each flow entry in the flow table further comprises a pointer field and a key field, wherein the pointer field contains a respective pointer indicating a location where a respective instruction is stored, and wherein the key field contains a respective match key.

4. The method of claim 3, wherein each flow entry of the one or more flow entries comprises a synchronized-entry mode flow entry.

5. The method of claim 3, wherein the utilizing of the match key in one or more flow entries in the flow table to obtain the first instruction for the first flow engine and the second instruction for the second flow engine further comprises performing action assignment to the first flow engine and the second flow engine in an asymmetric fashion.

6. The method of claim 5, wherein the performing of action assignment to the first flow engine and the second flow engine in an asymmetric fashion comprises:
  obtaining the first instruction using a pointer in the pointer field of at least one of the one or more flow entries; and
  obtaining the second instruction using a constant value.

7. The method of claim 3, wherein the utilizing of the match key in one or more flow entries in the flow table to obtain the first instruction for the first flow engine and the second instruction for the second flow engine further comprises performing action assignment to the first flow engine and the second flow engine in a symmetric fashion.

8. The method of claim 7, wherein the performing of action assignment to the first flow engine and the second flow engine in a symmetric fashion comprises:
  obtaining the first instruction using a pointer in the pointer field of at least one flow entry of the one or more flow entries;
  transforming the pointer into a transformed pointer; and
  obtaining the second instruction using the transformed pointer.

9. The method of claim 3, wherein the utilizing of the match key in one or more flow entries in the flow table to obtain the first instruction for the first flow engine and the second instruction for the second flow engine further comprises:
  obtaining the first instruction using a first pointer based on a pointer in the pointer field of at least one flow entry of the one or more flow entries; and
  obtaining the second instruction using a second pointer based on the pointer in the pointer field of the at least one flow entry,
  wherein the pointer in the pointer field of the at least one flow entry contains a combination the first pointer and the second pointer, and
  wherein the first pointer and the second pointer are directly concatenated to form the pointer such that a most significant bit (MSB) of the first pointer is concatenated to a least significant bit (LSB) of the second pointer, with an LSB of the first pointer being an LSB of the pointer and with an MSB of the second pointer being an MSB of the pointer.

10. The method of claim 3, wherein the utilizing of the match key in one or more flow entries in the flow table to obtain the first instruction for the first flow engine and the second instruction for the second flow engine further comprises:
  obtaining the first instruction using a first pointer based on a pointer in the pointer field of at least one flow entry of the one or more flow entries; and
  obtaining the second instruction using a second pointer based on the pointer in the pointer field of the at least one flow entry,
  wherein the pointer in the pointer field of the at least one flow entry contains a combination the first pointer and the second pointer, and
  wherein the first pointer and the second pointer are reversely concatenated to form the pointer such that a most significant bit (MSB) of the first pointer is concatenated to an MSB of the second pointer, with a least significant bit (LSB) of the first pointer being an LSB of the pointer and with an LSB of the second pointer being an MSB of the pointer.

11. The method of claim 1, wherein the utilizing of the match key in one or more flow entries in the flow table to obtain the first instruction for the first flow engine and the second instruction for the second flow engine further comprises:
  maintaining a first flow entry of the one or more flow entries in a synchronized-entry mode; and
  utilizing the first flow entry to obtain the first instruction and the second instruction.

12. The method of claim 1, wherein the utilizing of the match key in one or more flow entries in the flow table to obtain the first instruction for the first flow engine and the second instruction for the second flow engine further comprises:
  maintaining a first flow entry and a second flow entry of the one or more flow entries in a separated-entry mode;
  utilizing the first flow entry to obtain the first instruction; and
  utilizing the second flow entry to obtain the second instruction,
  wherein the first flow entry comprises a first pointer field containing a first pointer indicating a first location where the first instruction is stored,
  wherein the first flow entry also comprises a first port field containing a first port value indicating the first port,
  wherein the second flow entry comprises a second pointer field containing a second pointer indicating a second location where the second instruction is stored, and wherein the second flow entry also comprises a second port field containing a second port value indicating the second port.

13. An apparatus, comprising:
a memory configured to store a flow table; and
a processor operably coupled to the memory to access the flow table, the processor configured to perform operations comprising:
receiving a first key associated with a first flow engine through a first port and a second key associated with a second flow engine through a second port; and
utilizing a match key in one or more flow entries in the flow table to obtain a first instruction for the first flow engine and a second instruction for the second flow engine,
wherein each flow entry in the flow table further comprises a port field containing a port value, and
wherein, in utilizing the match key in one or more flow entries in the flow table to obtain the first instruction for the first flow engine and the second instruction for the second flow engine, the processor is configured to ignore the port value in the port field of the one or more flow entries in obtaining the first instruction for the first flow engine and the second instruction for the second flow engine.

14. The apparatus of claim 13, wherein, in utilizing the match key in one or more flow entries in the flow table to obtain the first instruction for the first flow engine and the second instruction for the second flow engine, the processor is capable of performing operations comprising:
determining that the first key matches the match key; and
determining that the second key matches the match key.

15. The apparatus of claim 13, wherein each flow entry in the flow table further comprises a pointer field and a key field, wherein the pointer field contains a respective pointer indicating a location where a respective instruction is stored, and wherein the key field contains a respective match key.

16. The apparatus of claim 15, wherein each flow entry of the one or more flow entries comprises a synchronized-entry mode flow entry.

17. The apparatus of claim 15, wherein, in utilizing the match key in one or more flow entries in the flow table to obtain the first instruction for the first flow engine and the second instruction for the second flow engine, the processor is further capable of performing action assignment to the first flow engine and the second flow engine in an asymmetric fashion.

18. The apparatus of claim 17, wherein, in performing action assignment to the first flow engine and the second flow engine in an asymmetric fashion, the processor is capable of performing operations comprising:
obtaining the first instruction using a pointer in the pointer field of at least one of the one or more flow entries; and
obtaining the second instruction using a constant value.

19. The apparatus of claim 15, wherein, in utilizing the match key in one or more flow entries in the flow table to obtain the first instruction for the first flow engine and the second instruction for the second flow engine, the processor is further capable of performing action assignment to the first flow engine and the second flow engine in a symmetric fashion.

20. The apparatus of claim 19, wherein, in performing action assignment to the first flow engine and the second flow engine in a symmetric fashion, the processor is capable of performing operations comprising:
obtaining the first instruction using a pointer in the pointer field of at least one flow entry of the one or more flow entries;
transforming the pointer into a transformed pointer; and
obtaining the second instruction using the transformed pointer.

21. The apparatus of claim 15, wherein, in utilizing the match key in one or more flow entries in the flow table to obtain the first instruction for the first flow engine and the second instruction for the second flow engine, the processor is further capable of performing operations comprising:
obtaining the first instruction using a first pointer based on a pointer in the pointer field of at least one flow entry of the one or more flow entries; and
obtaining the second instruction using a second pointer based on the pointer in the pointer field of the at least one flow entry,
wherein the pointer in the pointer field of the at least one flow entry contains a combination the first pointer and the second pointer, and
wherein the first pointer and the second pointer are directly concatenated to form the pointer such that a most significant bit (MSB) of the first pointer is concatenated to a least significant bit (LSB) of the second pointer, with an LSB of the first pointer being an LSB of the pointer and with an MSB of the second pointer being an MSB of the pointer.

22. The apparatus of claim 15, wherein, in utilizing the match key in one or more flow entries in the flow table to obtain the first instruction for the first flow engine and the second instruction for the second flow engine, the processor is further capable of performing operations comprising:
obtaining the first instruction using a first pointer based on a pointer in the pointer field of at least one flow entry of the one or more flow entries; and
obtaining the second instruction using a second pointer based on the pointer in the pointer field of the at least one flow entry,
wherein the pointer in the pointer field of the at least one flow entry contains a combination the first pointer and the second pointer, and
wherein the first pointer and the second pointer are reversely concatenated to form the pointer such that a most significant bit (MSB) of the first pointer is concatenated to an MSB of the second pointer, with a least significant bit (LSB) of the first pointer being an LSB of the pointer and with an LSB of the second pointer being an MSB of the pointer.

23. The apparatus of claim 13, wherein, in utilizing the match key in one or more flow entries in the flow table to obtain the first instruction for the first flow engine and the second instruction for the second flow engine, the processor is further capable of performing operations comprising:
maintaining a first flow entry of the one or more flow entries in a synchronized-entry mode; and
utilizing the first flow entry to obtain the first instruction and the second instruction.

24. The apparatus of claim 13, wherein, in utilizing the match key in one or more flow entries in the flow table to obtain the first instruction for the first flow engine and the second instruction for the second flow engine, the processor is further capable of performing operations comprising:
maintaining a first flow entry and a second flow entry of the one or more flow entries in a separated-entry mode;
utilizing the first flow entry to obtain the first instruction; and utilizing the second flow entry to obtain the second instruction, wherein the first flow entry comprises a first pointer field containing a first pointer indicating a first location where the first instruction is stored, wherein the first flow entry also comprises a first port field containing a first port value indicating the first port, wherein the second flow entry comprises a second pointer field containing a second pointer indicating a second location where the second instruction is stored, and wherein the second flow entry also comprises a second port field containing a second port value indicating the second port.

\* \* \* \* \*